(12) United States Patent
Auer (10) Patent No.: US 10,744,981 B2
(45) Date of Patent: Aug. 18, 2020

(54) ELECTROMECHANICAL BRAKING CONNECTOR

(71) Applicant: SENSATA TECHNOLOGIES, INC., Attleboro, MA (US)

(72) Inventor: Ruben Auer, Providence, RI (US)

(73) Assignee: SENSATA TECHNOLOGIES, INC., Attleboro, MA (US)

(*) Notice: Subject to any disclaimer, the term of this patent is extended or adjusted under 35 U.S.C. 154(b) by 100 days.

(21) Appl. No.: 16/001,035

(22) Filed: Jun. 6, 2018

(65) Prior Publication Data

US 2019/0375383 A1 Dec. 12, 2019

(51) Int. Cl.
*B60T 8/171* (2006.01)
*B60T 8/172* (2006.01)
*B60T 13/74* (2006.01)

(52) U.S. Cl.
CPC ............. *B60T 8/171* (2013.01); *B60T 8/172* (2013.01); *B60T 13/746* (2013.01)

(58) Field of Classification Search
CPC ........ B60T 8/171; B60T 8/172; B60T 13/746; H01R 31/06; G01L 1/22; G01L 1/2231; G01L 1/2282; G01L 5/00; G01L 5/25; G01L 5/28; G01L 5/225; G01B 5/0025; G01B 5/0028; B61H 5/00; F16D 65/18; F16D 66/00; F16D 2066/005
USPC .................................. 188/156; 439/638, 103
See application file for complete search history.

(56) References Cited

U.S. PATENT DOCUMENTS

| 6,139,117 | A | 10/2000 | Shirai et al. |
| 6,176,352 | B1 | 1/2001 | Maron et al. |
| 6,679,355 | B2 | 1/2004 | Suzuki |
| 2005/0140205 | A1 | 6/2005 | Ante et al. |
| 2005/0269872 | A1 | 12/2005 | Ralea |
| 2006/0123916 | A1* | 6/2006 | Parker .................. G01L 9/0052 73/754 |
| 2007/0029143 | A1* | 2/2007 | Adachi ................. B60T 13/741 188/72.8 |

(Continued)

FOREIGN PATENT DOCUMENTS

| CN | 103507801 B | 11/2015 |
| DE | 102 96 882 T5 | 8/2004 |

(Continued)

*Primary Examiner* — Robert A. Siconolfi
*Assistant Examiner* — San M Aung (57) ABSTRACT

An electromechanical braking (EMB) connector for electrical communication between an interior of a brake caliper assembly and an exterior of the brake caliper assembly is disclosed. The EMB connector includes a body having a distal end for insertion into the interior of the brake caliper assembly and a proximal end for exposure on the exterior of the brake caliper assembly, with the distal end and the proximal end defining a body axis. The EMB connector also includes a load sensor connector for coupling with a load sensor disposed on the interior of the brake caliper assembly. The load sensor connector is compressible along a load sensor axis that is substantially perpendicular to the body axis. The EMB connector further includes a conductive component coupled to the load sensor connector. The conductive component enables electrical connection of the load sensor to the exterior of the brake caliper assembly.

20 Claims, 9 Drawing Sheets

(56) References Cited

U.S. PATENT DOCUMENTS

| | | | |
|---|---|---|---|
| 2008/0042797 A1* | 2/2008 | Nakasone | G01L 1/2231 338/5 |
| 2008/0098826 A1 | 5/2008 | Luthje et al. | |
| 2009/0139774 A1* | 6/2009 | Takayasu | B60N 2/002 177/136 |
| 2010/0288377 A1* | 11/2010 | Habibi | G01L 19/0007 137/511 |
| 2013/0014595 A1 | 1/2013 | Huizinga et al. | |

FOREIGN PATENT DOCUMENTS

| | | |
|---|---|---|
| EP | 1 107 007 B1 | 11/2005 |
| EP | 1985884 A1 | 10/2008 |
| EP | 2431628 A1 | 3/2012 |
| EP | 2907697 A2 | 8/2015 |
| EP | 3578429 A1 | 12/2019 |
| KR | 2016-0091699 A | 8/2016 |
| KR | 10-1714052 B1 | 3/2017 |
| WO | 2005059395 A1 | 6/2005 |
| WO | 2013117443 A1 | 8/2013 |
| WO | 2017126560 A1 | 7/2017 |

\* cited by examiner

ELECTROMECHANICAL BRAKING CONNECTOR

FIELD OF THE INVENTION

The present disclosure relates to electromechanical braking technology.

BACKGROUND OF THE INVENTION

In the automotive industry, brake-by-wire technology is the ability to control brakes through electrical means. Such technology is designed to replace conventional components such as pumps, hoses, fluids, belts and vacuum servos and master cylinders with electronic sensors and actuators. The automotive brake-by-wire market is striving to add load sensors directly into a brake caliper assembly, which represents a significant challenge to fit a reliable connection without impacting other internal brake components.

SUMMARY OF THE INVENTION

According to one embodiment, an electromechanical braking (EMB) connector for electrical communication between an interior of a brake caliper assembly and an exterior of the brake caliper assembly is disclosed. The EMB connector includes a body having a distal end for insertion into the interior of the brake caliper assembly and a proximal end for exposure on the exterior of the brake caliper assembly, with the distal end and the proximal end defining a body axis. The EMB connector also includes a load sensor connector for coupling with a load sensor disposed on the interior of the brake caliper assembly. The load sensor connector is compressible along a load sensor axis that is substantially perpendicular to the body axis. The EMB connector further includes a conductive component coupled to the load sensor connector. The conductive component enables electrical connection of the load sensor to the exterior of the brake caliper assembly.

The EMB connector provides a reliable electrical connection to the internal load sensor, enabling communication of load sensor data outside of the brake caliper assembly in the high vibration environment of an operating vehicle. The load sensor connector is designed to experience deformation when exposed to vibration, thereby maintaining constant contact with the internal load sensor. The robust nature of the EMB connector design reduces the required space for implementation and allows a substantially ninety-degree connection on the inside of a cramped brake caliper assembly environment.

According to another embodiment, a brake caliper assembly is disclosed that includes a brake caliper, a load sensor, and an EMB connector. The brake caliper has an orifice extending through the brake caliper from an exterior of the brake caliper assembly to an interior of the brake caliper assembly. The load sensor is disposed within the interior of the brake caliper assembly. The EMB connector includes a body having a distal end for insertion into the interior of the brake caliper assembly and a proximal end for exposure on the exterior of the brake caliper assembly, with the distal end and the proximal end defining a body axis. The EMB connector also includes a load sensor connector for coupling with a load sensor disposed on the interior of the brake caliper assembly. The load sensor connector is compressible along a load sensor axis that is substantially perpendicular to the body axis. The EMB connector further includes a conductive component coupled to the load sensor connector. The conductive component enables electrical connection of the load sensor to the exterior of the brake caliper assembly.

According to yet another embodiment, an EMB system is disclosed. The electromechanical braking system includes a brake caliper assembly, a load sensor disposed within an interior of the brake caliper assembly, and an EMB connector enabling electrical connection of the load sensor to an electronic control unit (ECU) on the exterior of the brake caliper assembly. The brake caliper assembly includes a brake caliper having an orifice extending through the brake caliper from an exterior of the brake caliper assembly to an interior of the brake caliper assembly. The load sensor is disposed within the interior of the brake caliper assembly. The EMB connector includes a body having a distal end for insertion into the interior of the brake caliper assembly and a proximal end for exposure on the exterior of the brake caliper assembly, with the distal end and the proximal end defining a body axis. The EMB connector also includes a load sensor connector for coupling with a load sensor disposed on the interior of the brake caliper assembly. The load sensor connector is compressible along a load sensor axis that is substantially perpendicular to the body axis. The EMB connector further includes a conductive component coupled to the load sensor connector. The conductive component enables electrical connection of the load sensor to the exterior of the brake caliper assembly.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

So that those having ordinary skill in the art to which the disclosed technology appertains will more readily understand how to make and use the same, reference may be had to the following drawings.

DETAILED DESCRIPTION

The present disclosure describes an electromechanical braking (EMB) connector that permits electrical communication of sensor data from a load sensor contained within a brake caliper assembly to an exterior of the brake caliper assembly, while ensuring adequate ingress protection level and constant electrical connection. The EMB connector of the present disclosure is designed to provide a robust connection to the internal load sensor, while mounted on application at the wheel barrel. The EMB connector of the present disclosure includes compressible components designed to withstand a high vibration level profile while maintaining contact with the internal load sensor without loss or degradation of communication between the load sensor and a mating harness disposed on the exterior of the brake caliper assembly. This solution provides very compact piece dimensions, reducing the required space for implementation and allowing a substantially ninety-degree connection on the inside of the brake caliper assembly.

The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words defining orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e., where an "upper" part must always be on top).

Figure 1:
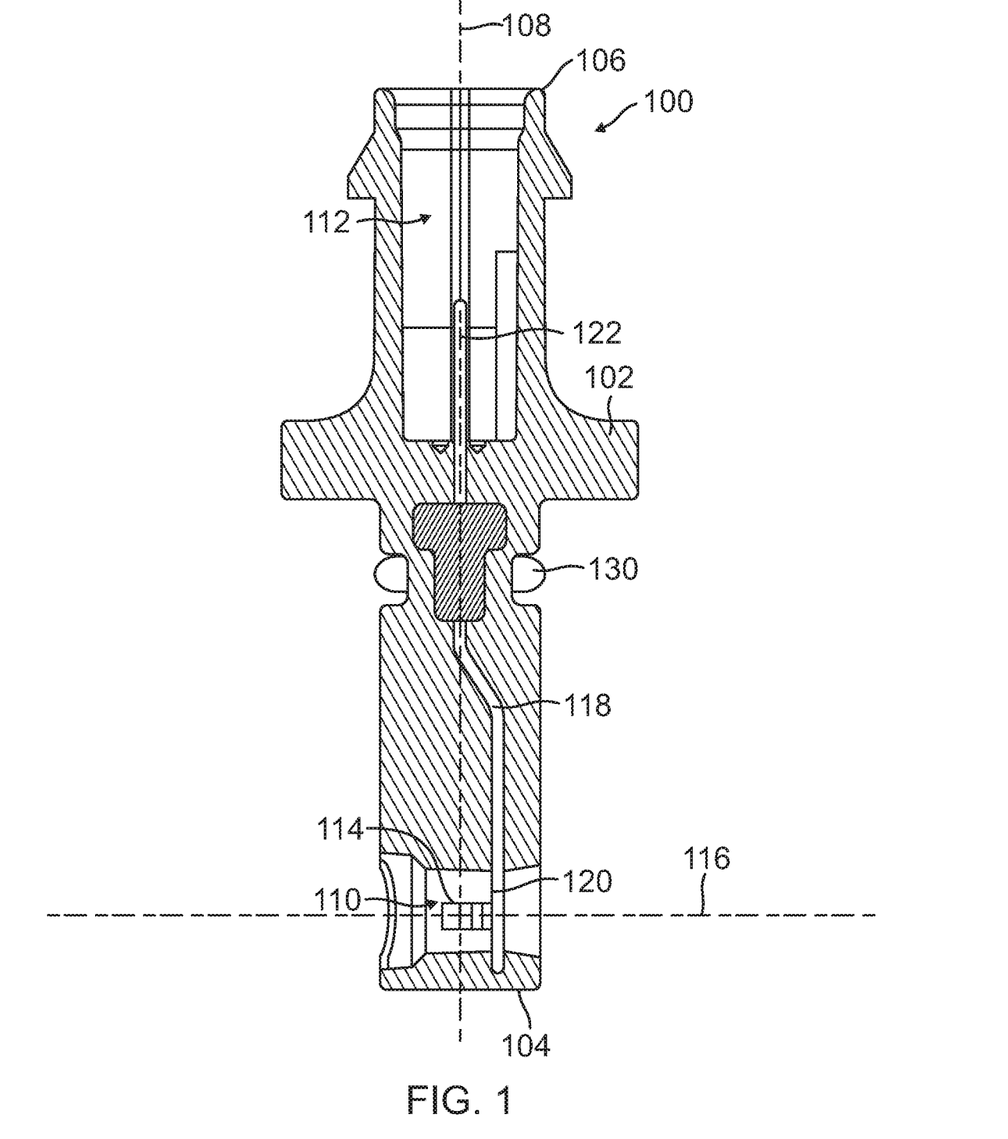
FIG. 1 is a cross-sectional view of an EMB connector that permits electrical communication of load sensor data from an interior of a brake caliper assembly to an exterior of the brake caliper assembly, according to one embodiment of the present disclosure.

FIG. 1 illustrates a cross-sectional view of an EMB connector 100, according to one embodiment of the present disclosure. As illustrated and further described herein, the EMB connector 100 depicted in FIG. 1 permits electrical communication of load sensor data from an interior of a brake caliper assembly to an exterior of the brake caliper assembly. FIG. 1 is a standalone view of the EMB connector 100 outside of a brake caliper assembly prior to insertion of one end of the EMB connector 100 into an orifice that may be machined into a brake caliper (see e.g. FIG. 2). An example of load sensor data includes a measurement of an amount of force applied to a brake pad by the brake caliper during a braking operation. The amount of force may be useful as feedback to an electronic control unit (ECU) of an EMB system in conjunction with a speed measurement, an estimated distance sufficient for braking from location sensor(s), etc. to enable the ECU to make appropriate braking position adjustments.

Figure 2:
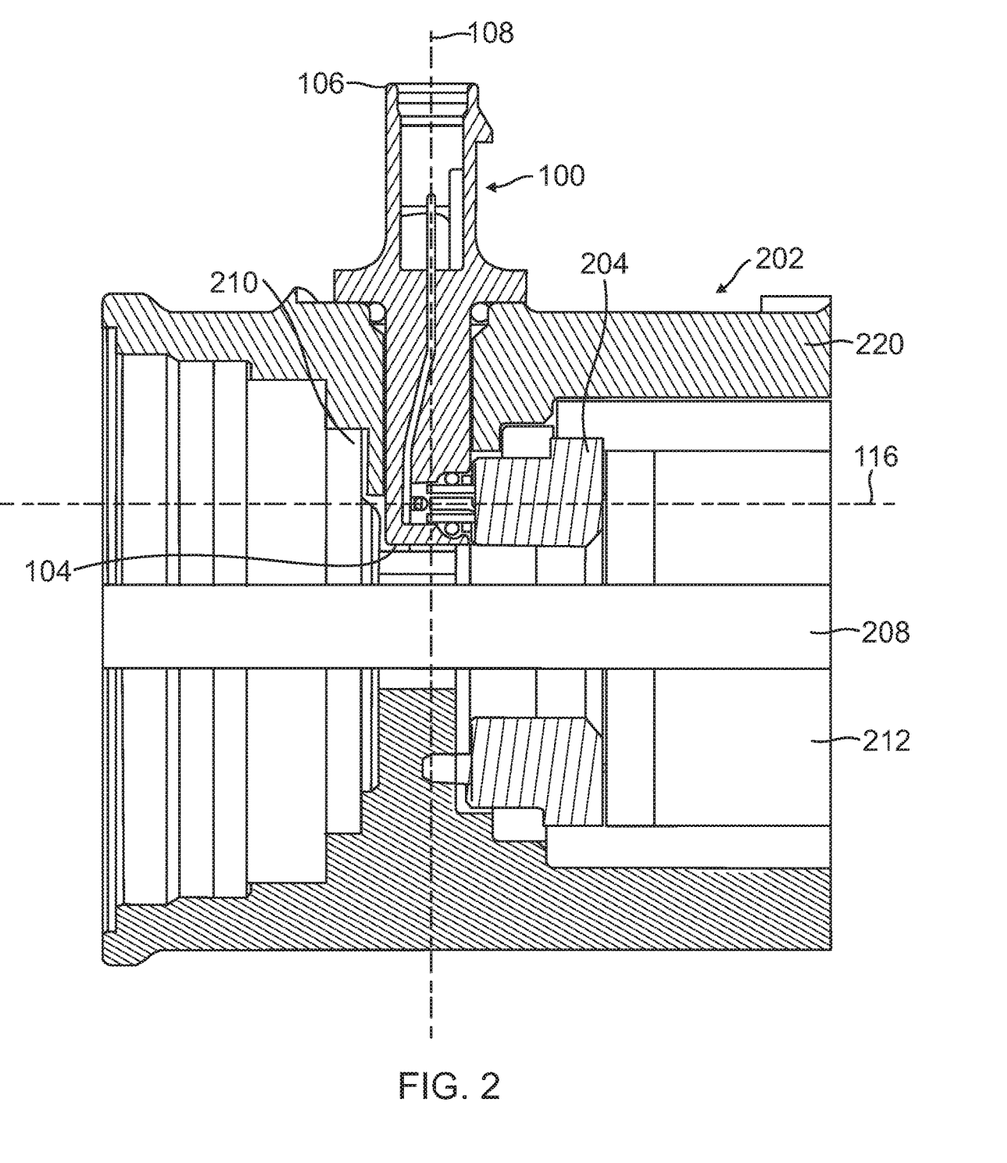
FIG. 2 is a side view of selected portions of a brake caliper assembly including the EMB connector depicted in FIG. 1.

The EMB connector 100 includes a body 102 having a distal end 104 for insertion into the interior of a brake caliper assembly and a proximal end 106 for exposure on the exterior of the brake caliper assembly (see e.g. FIG. 2). The distal end 104 and the proximal end 106 define a body axis 108 of the EMB connector 100. The distal end 104 includes a load sensor mating orifice 110, and the proximal end 106 includes a wire harness mating orifice 112. The EMB connector 100 also includes a load sensor connector 114 for coupling with a load sensor disposed on the interior of the brake caliper assembly. The load sensor connector 114 is compressible along a load sensor axis 116 that is substantially perpendicular to the body axis 108.

The EMB connector 100 further includes a conductive component 118 coupled to the load sensor connector 114. The conductive component 118 enables electrical connection of the internal load sensor to the exterior of the brake caliper assembly. The load sensor connector 114 is disposed within the load sensor mating orifice 110, and the conductive component 118 includes a distal portion 120 that is exposed within the load sensor mating orifice 110 and a proximal portion 122 that is exposed within the wire harness mating orifice 112. In the embodiment depicted in FIG. 1, the EMB connector 100 includes a sealing ring 130 (e.g., an "O-ring") to provide a seal between the interior and exterior of the brake caliper assembly after insertion of the EMB connector 100 into an orifice of a brake caliper (as illustrated and further described herein with respect to FIG. 2). While not visible in the cross-sectional view depicted in FIG. 1, the conductive component 118 may correspond to a plurality of conductive wires/rods (e.g., Cu wires) that extend from the distal portion 120 to the proximal portion 122 (see e.g. the cut-away view of FIG. 6). The individual conductive wires/rods may be electrically isolated from each other to enable multiple load sensor signals to be communicated from the load sensor to an external component, such as an ECU. For example, the body 102 may correspond to a plastic or other non-conductive material to enable electrical isolation of such independent signals.

Figure 3:
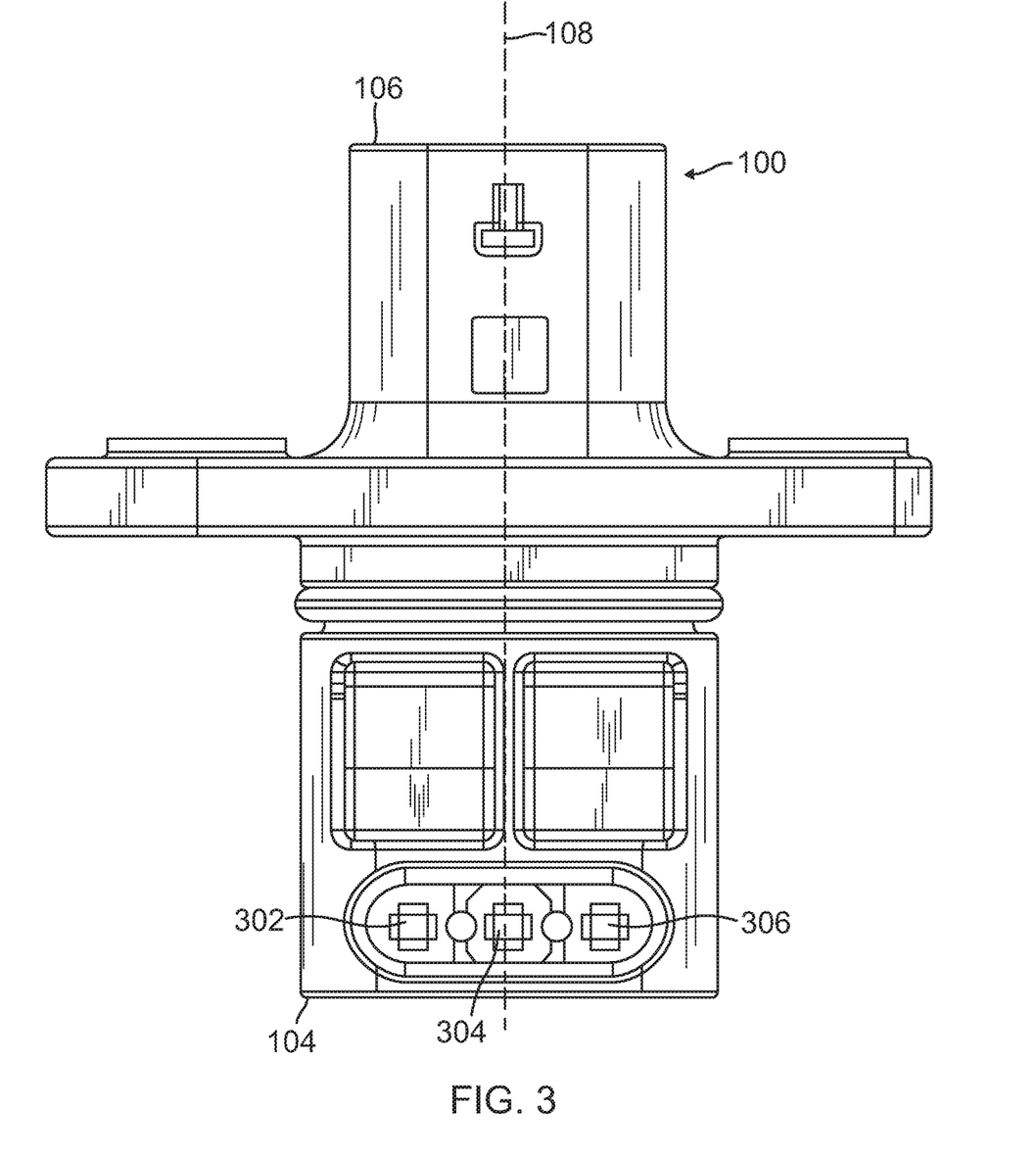
FIG. 3 is a front view of the EMB connector depicted in FIG. 1.
Figure 4:
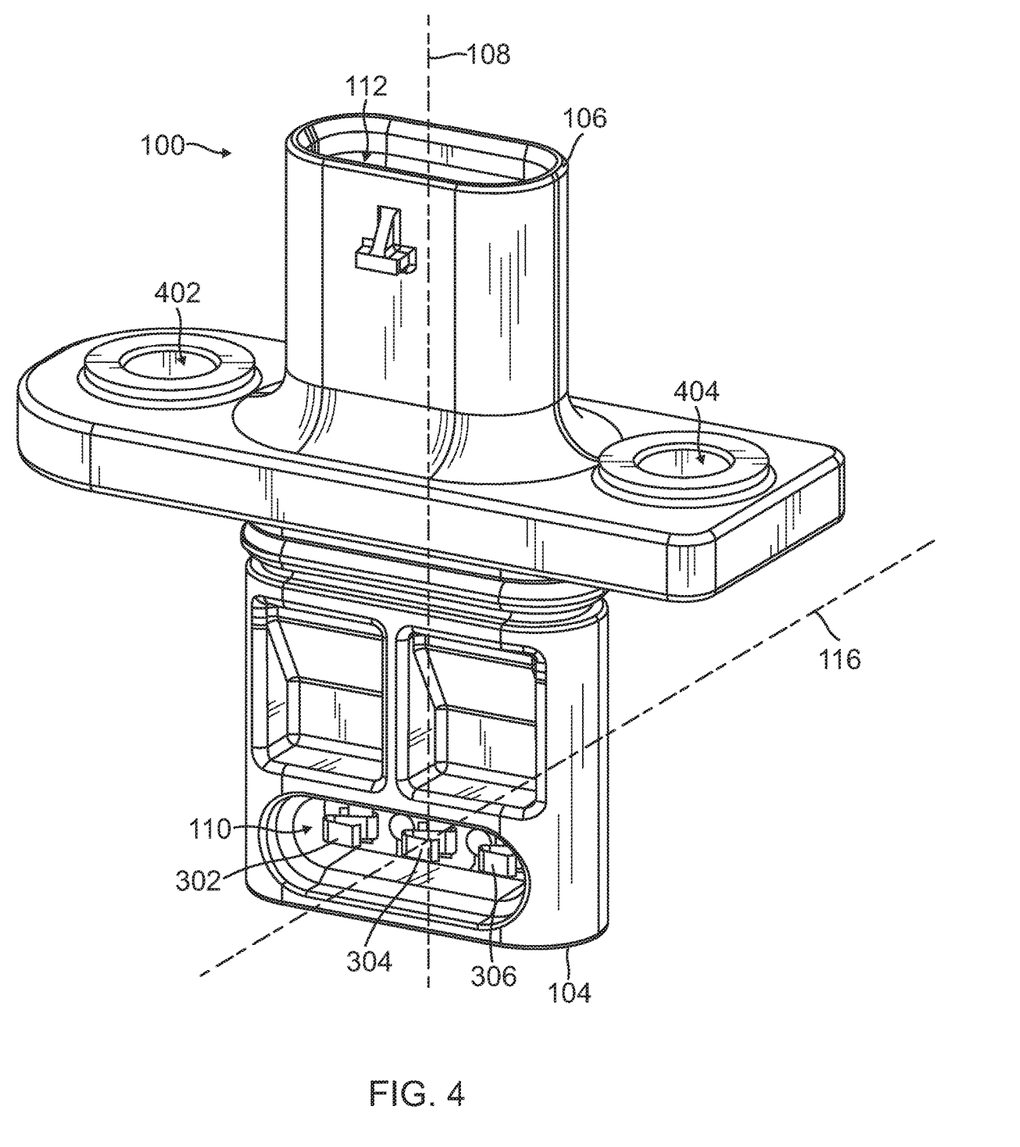
FIG. 4 is a front isometric view of the EMB connector depicted in FIG. 1.
Figure 5:
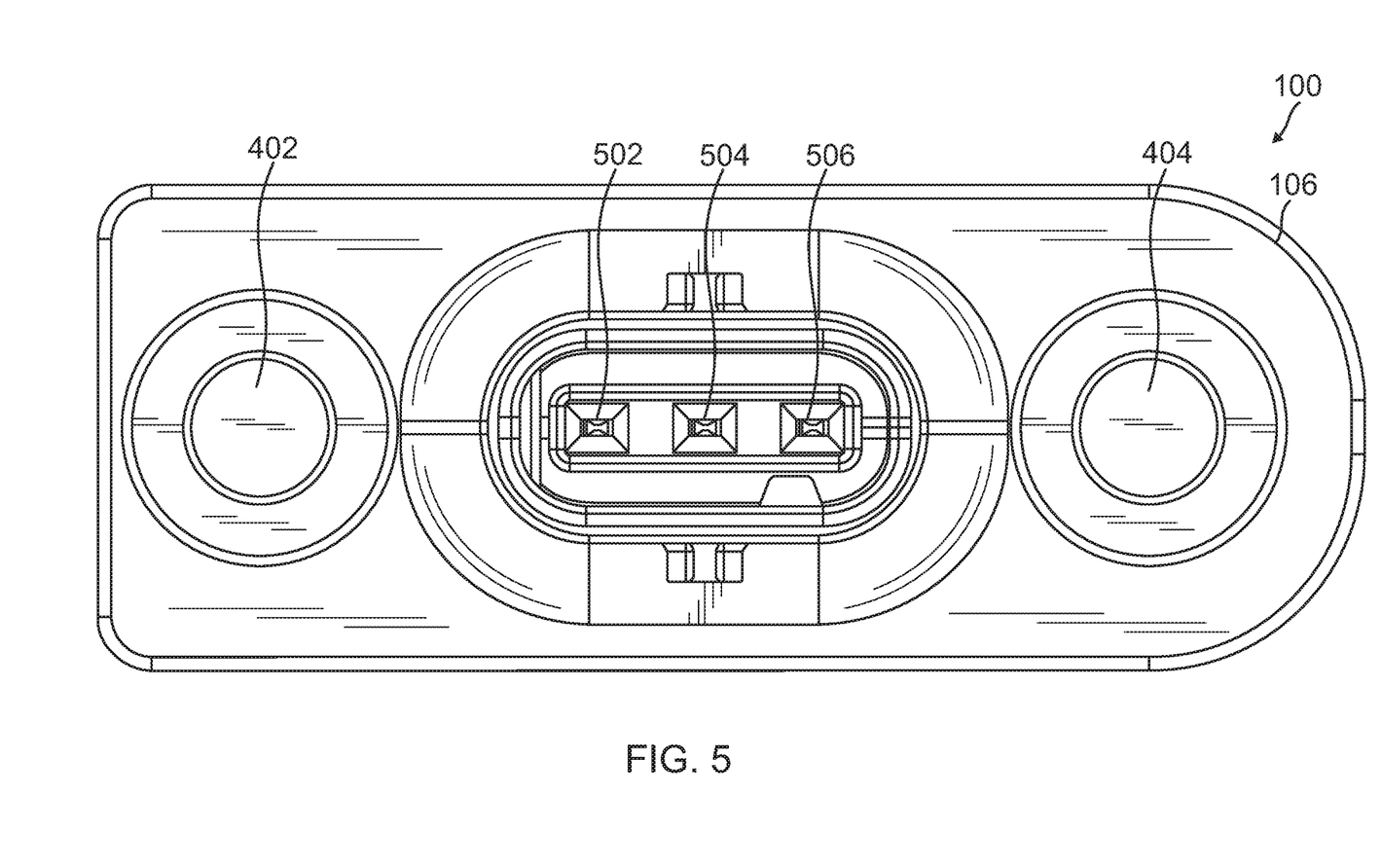
FIG. 5 is a top view of the EMB connector depicted in FIG. 1.

In some embodiments, while not visible in the cross-sectional view depicted in FIG. 1, the load sensor connector 114 may include multiple compressible components that are designed to withstand a high vibration level profile while maintaining contact with an internal load sensor. To illustrate, FIG. 3 depicts a front view of one embodiment of the EMB connector 100 in which the load sensor connector 114 includes three compressible components 302-306 that are exposed within the load sensor mating orifice 110 for coupling to a load sensor. Further, while not visible in the cross-sectional view depicted in FIG. 1, the conductive component 118 may include multiple pins, with the individual compressible components coupled to individual pins. To illustrate, FIGS. 4 and 5 depict one embodiment in which the three compressible components 302-306 exposed within the load sensor mating orifice 110 are coupled to three pins 502-506 exposed within the wire harness mating orifice 112 for coupling to a wire harness (not shown). It will be appreciated that the EMB connector 100 may include an alternative number and/or arrangement of compressible component(s) coupled to conductive component(s) in order to effect a reliable electrical connection between an internal load sensor and an exterior of the brake caliper assembly.

In FIG. 1, the EMB connector 100 has a characteristic dimension (i.e., depth) between a surface of the EMB connector 100 exposed at the distal end 104 and the load sensor axis 116. The characteristic dimension is selected such that the load sensor connector 114 extends to a known depth within a particular brake caliper assembly to align with an interface of an internal load sensor (see e.g., the load sensor 204 of FIGS. 2 and 9) without interference with other critical brake components. The compressibility of the load sensor connector 114 along the load sensor axis 116 compensates for tolerance stack-up and maintains positive contact force with the internal load sensor. To illustrate, both the internal load sensor and the load sensor connector 114 may experience significant vibration during vehicle operation. As such, the load sensor connector 114 may have a spring-loaded design, such as an S-shaped design, that enables the load sensor connector 114 to deform along the load sensor axis 116 both toward the distal portion 120 of the conductive component 118 and away from the distal portion 120 of the conductive component 118 in order to maintain contact with the internal load sensor. After such a deformation, the spring-loaded design enables the load sensor connector 114 to return to its original shape, thereby continuing to maintain positive contact with the internal load sensor.

FIG. 2 illustrates the EMB connector 100 of FIG. 1 after being coupled to a brake caliper assembly 202. A load sensor 204 is contained within the brake caliper assembly 202. The distal end 104 of the EMB connector 100 is inserted into the brake caliper assembly 202 and is positioned adjacent to the load sensor 204, and the proximal end 106 is exposed outside of the brake caliper assembly 202 to permit electrical connection of the load sensor 204 to the exterior of the brake caliper assembly 202. Additional components depicted in FIG. 2 include a transmission shaft 208, a load bearing 210, and a load bearing and actuator assembly 212. Operation of the transmission shaft 208 during a brake-by-wire operation is described further herein with respect to FIG. 9. In the cross-sectional view depicted in FIG. 2, the load bearing 210 is disposed within the brake caliper 220 on an opposite side of the EMB connector 100 (with respect to the body axis 108) from the load bearing and actuator assembly 212. As further illustrated in FIG. 9, the portion of the transmission shaft 208 depicted in FIG. 2 extends to the screw 812 to facilitate movement of the piston 820 for increased/decreased brake force application.

The brake caliper assembly 202 includes a brake caliper 220 having an orifice extending through the brake caliper 220 from the exterior of the brake caliper assembly 202 to the interior of the brake caliper assembly 202. An exterior surface of the brake caliper 220 corresponds to the proximal end 106 of the EMB connector 100 and defines an exterior of the brake caliper assembly 202. An interior surface of the brake caliper 220 corresponds to the distal end 104 of the EMB connector 100 and defines an interior of the brake caliper assembly 202. Upon insertion into the orifice of the brake caliper 220, the distal end 104 of the EMB connector 100 is exposed on the interior of the brake caliper assembly 202, and that the proximal end 106 of the EMB connector 100 is exposed on the exterior of the brake caliper assembly 202.

Figure 8:
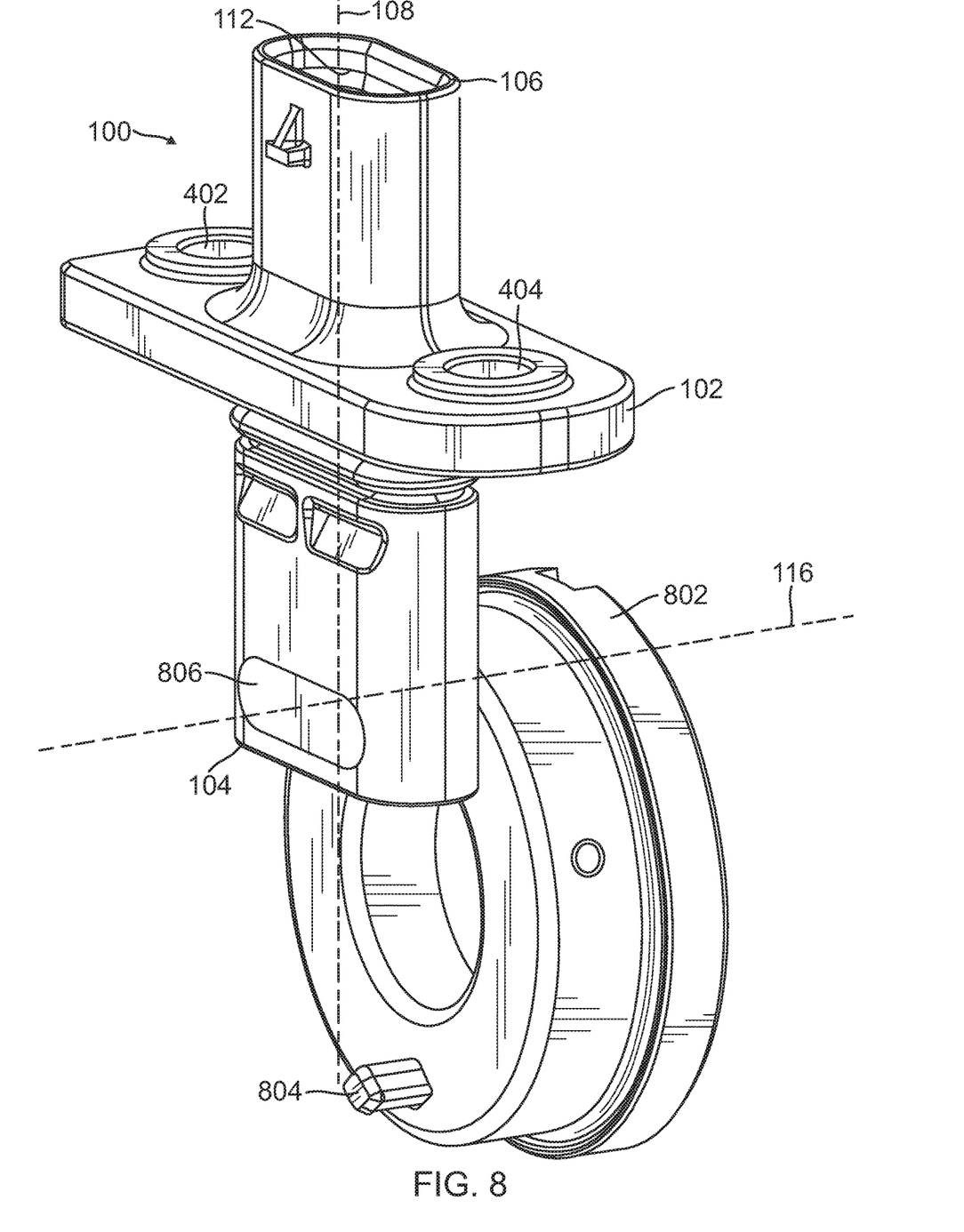
FIG. 8 is a perspective view of the EMB connector oriented substantially perpendicular to an internal load sensor.
Figure 9:
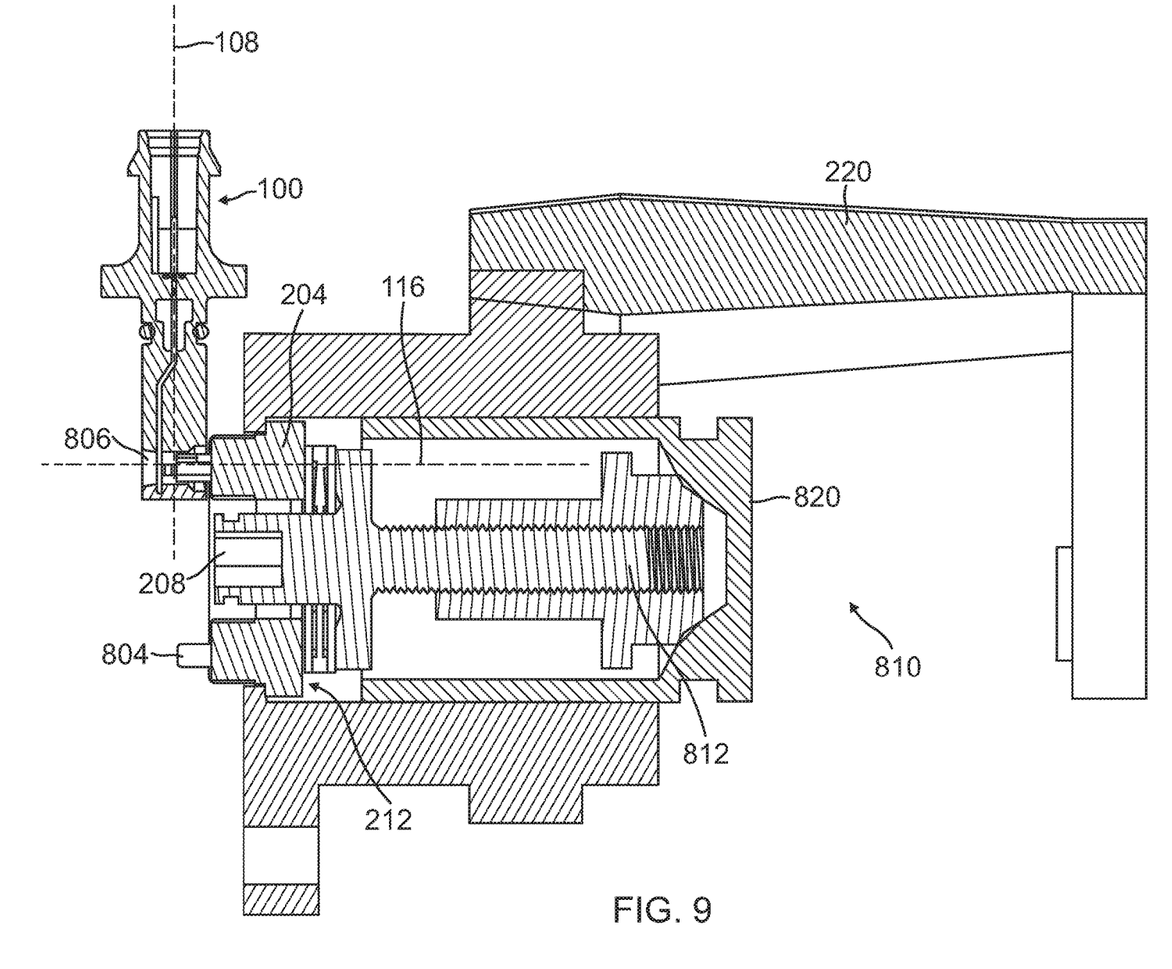
FIG. 9 is a cross-sectional view of a portion of an electromechanical braking system, illustrating the substantially perpendicular orientation of the EMB connector with respect to an internal load sensor.

FIG. 2 illustrates that, after insertion of the EMB connector 100 into a brake caliper assembly 202, the body axis 108 is substantially perpendicular to an internal load sensor 204. FIGS. 8 and 9 depict alternative views of the substantially perpendicular orientation of the body axis 108 with respect to the internal load sensor 204.

FIG. 3 illustrates that the load sensor connector 114 depicted in FIG. 1 may include a plurality of compressible components. In the embodiment depicted in FIG. 3, the load sensor connector 114 includes a first compressible component 302, a second compressible component 304, and a third compressible component 306. While not shown in the front view of FIG. 3, each of the compressible components 302-306 may have the "S-clip" design depicted in the front isometric view of FIG. 4. Each of the compressible components 302-306 is designed to experience deformation when exposed to vibration, thereby maintaining constant contact with the load sensor 204 during high-vibration vehicle operation. FIGS. 3 and 4 illustrate the compressible components 302-306 as being exposed within the load sensor mating orifice 110 prior to the EMB connector 100 being mated to the load sensor 204. Upon assembly, individual connectors (e.g., pins) of the load sensor 204 partially extend into the load sensor mating orifice 110 along the load sensor axis 116 to establish electrical contact with the individual compressible components 302-306.

FIG. 4 is a front isometric view of the EMB connector 100 depicted in FIG. 3, showing an "S-clip" design for the compressible components 302-306 to enable the EMB connector 100 to withstand a high vibration level profile while maintaining contact with an internal load sensor (e.g., the load sensor 204 of FIG. 2) without loss or degradation of communication between the load sensor 204 and a mating harness (not shown) via the mating harness interface 112. FIG. 4 illustrates that the individual compressible components 302-306 are exposed within the load sensor mating orifice 110 for mating with individual connectors (e.g., three pins) of the load sensor 204. The "S-clip" design enables the compressible components 302-306 to experience displacements along the load sensor axis 116 (e.g., as a result of vibration during vehicle operation) while maintaining a contact force on the corresponding connectors of the load sensor 204 that is sufficient to prevent disruption/degradation of electrical signals from the load sensor 204. To illustrate, vibration may result in movement of the load sensor 204 into the load sensor orifice 110 or away from the load sensor orifice 110. As an example, movement of the load sensor 204 into the load sensor orifice 110 results in increased force being applied to the compressible components 302-306, with an associated increase in component strain. Movement of the load sensor 204 away from the load sensor orifice 110 results in decreased force being applied to the compressible components 302-306, with an associated decrease in component strain. The compressible design ensures that frequent changes in component strain are insufficient to cause degradation/disruption of electrical connections with the load sensor 204.

FIG. 4 further illustrates hardware attachment areas 402, 404 that allow the EMB connector 100 to be mechanically fixed to a brake caliper (e.g., the brake caliper 220 of FIG. 2) to hold the EMB connector 100 in place. As an example, the hardware attachment areas 402, 404 may be aligned with holes that have been formed in the brake caliper on opposite sides of the orifice designed to receive the EMB connector 100. After insertion of the distal end 104 of the EMB connector 100 into the brake caliper, the EMB connector 100 may be fixed to the brake caliper using bolts, screws or other mechanical attachment means.

FIG. 5 is a top view of the EMB connector 100, further illustrating that the conductive component 118 depicted in FIG. 1 may include a plurality of pins, with the individual compressible components coupled to individual pins. For example, in FIG. 5, the first compressible component 302 (see FIGS. 3 and 4) is coupled to a first pin 502, the second compressible component 304 (see FIGS. 3 and 4) is coupled to a second pin 504, and the third compressible component 306 (see FIGS. 3 and 4) is coupled to a third pin 506. FIG. 5 illustrates that the individual pins 502-506 are exposed within the wire harness mating orifice 112 for mating with individual connection inputs (e.g., three female ports) of a wire harness. The pins 502-506 are formed from a conductive material (e.g., Cu) and enable electrical signals to be communicated from the interior of the brake caliper assembly 202 to the exterior of the brake caliper assembly 202.

The first pin 502 enables communication of a first electrical signal from the load sensor 204 to the exterior of the brake caliper assembly 202 by establishing a first electrical pathway for the first electrical signal from a corresponding connector of the load sensor 204. The second pin 504 enables communication of a second electrical signal from the load sensor 204 to the exterior of the brake caliper assembly 202 by establishing a second electrical pathway for the second electrical signal from a corresponding connector of the load sensor 204. The third pin 506 enables communication of a third electrical signal from the load sensor 204 to the exterior of the brake caliper assembly 202 by establishing a third electrical pathway for the third electrical signal from a corresponding connector of the load sensor 204.

A wire harness (not shown) may be coupled to the EMB connector 100 via the wire harness mating orifice 112 to permit the electrical signals from the load sensor 204 to be communicated to a computing device (not shown), such as an electronic control unit (ECU) of an electromechanical braking system. To illustrate, the wire harness may include a first connection input to receive the first pin 502, a second connection input to receive the second pin 504, and a third connection input to receive the third pin 506. Accordingly, the first pin 502 and the first connection input of the wire harness enable communication of first load sensor data from the load sensor 204 of FIG. 2 to the computing device for processing. The second pin 504 and the second connection input of the wire harness enable communication of second load sensor data from the load sensor 204 to the computing device, and the third pin 506 and the third connection input of the wire harness enable communication of third load sensor data from the load sensor 204 to the computing device.

Figure 6:
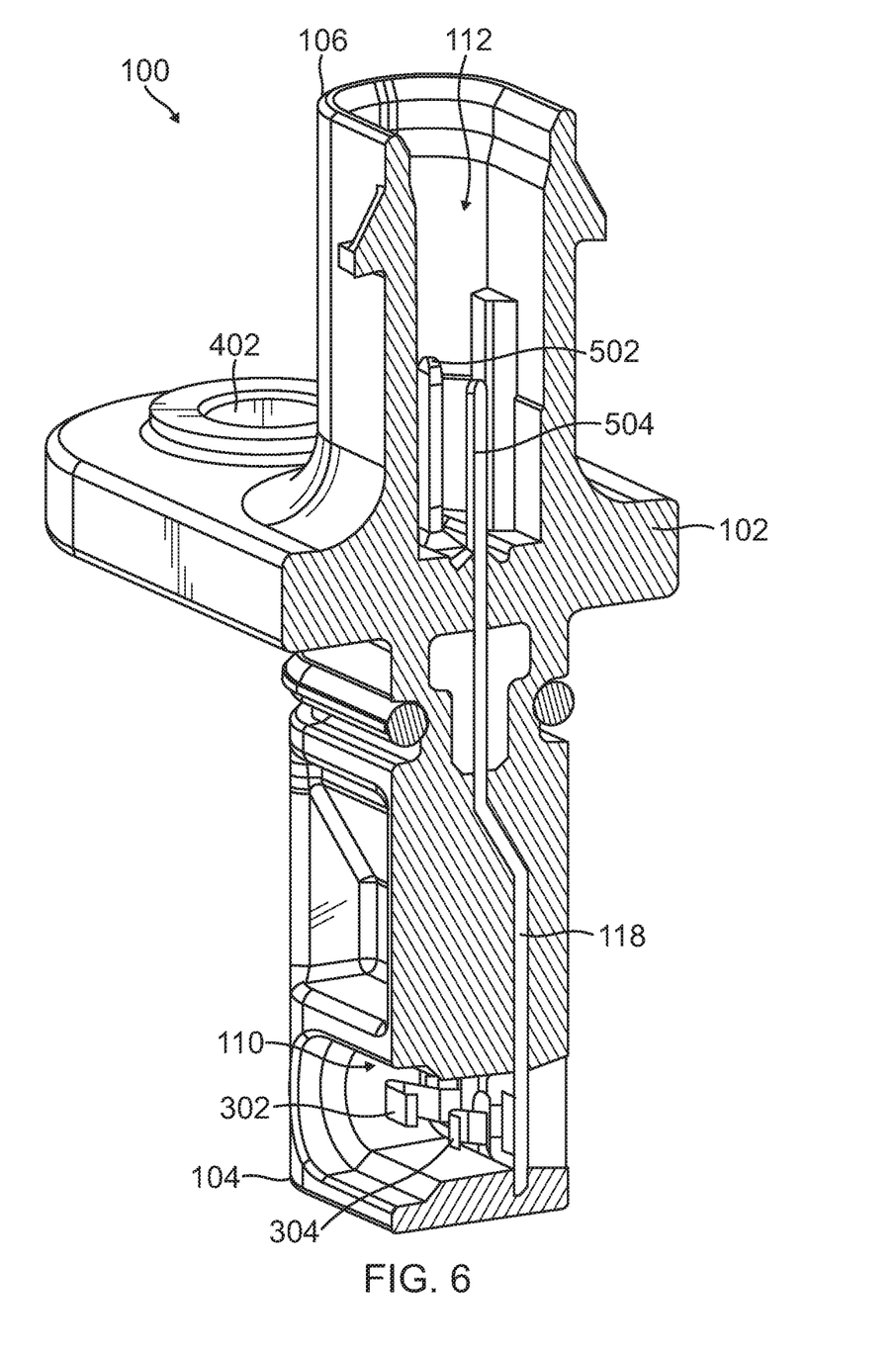
FIG. 6 is a cut-away view of the EMB connector depicted in FIG. 1.

FIG. 6 is a cut-away view of the EMB connector 100, showing internal components, including selected electrical connections between the load sensor mating orifice 110 and the wire harness mating orifice 112. The cut-away view illustrates an example in which the conductive component 118 is associated with the second pin 504. It will be appreciated that similar discrete conductive components are associated with the other pins 502, 506.

In FIG. 6, a portion of the conductive component 118 within the body 102 of the EMB connector 100 is illustrated. The conductive component 118 traverses the body 102 to electrically connect the first and second compressible components 302, 304 exposed within the load sensor mating orifice 110 to the first and second pins 502, 504 exposed within the wire harness mating orifice 112, respectively. It will be appreciated that the conductive component 118 provides a similar conductive pathway for the third compressible component 306 to the third pin 506 that are omitted in the cut-away view depicted in FIG. 6.

Figure 7:
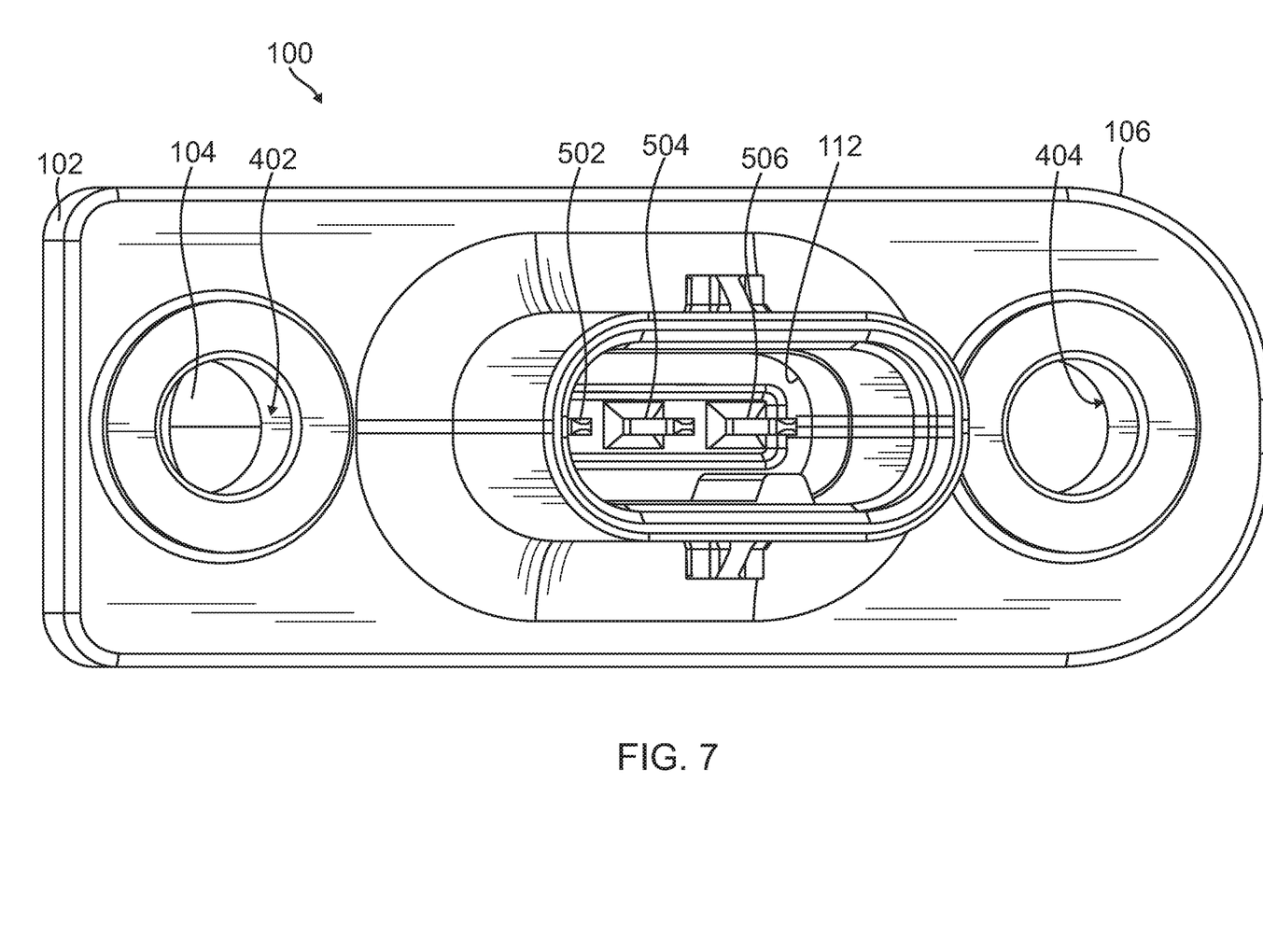
FIG. 7 is a top isometric view of the EMB connector depicted in FIG. 1.

FIG. 7 is a top isometric view of the EMB connector 100 depicted in FIG. 1, illustrating the orientation of the pins 502-506 at the proximal end 106 of the EMB connector 100 with respect to the distal end 104 of the EMB connector 100.

FIG. 8 is a perspective view, illustrating the substantially perpendicular orientation of the EMB connector 100 depicted in FIG. 1 with respect to an internal load sensor. FIG. 8 illustrates a design for a load sensor 802 having a substantially circular shape with an annular orifice to enable the load sensor 802 to be mated to the transmission shaft 208 (see e.g. the cross-sectional view of FIG. 9). In FIG. 8, a top portion of the load sensor 802 (identified by reference character 204 in FIG. 9) is mated to the EMB connector 100 at the distal end 104, with the load sensor mating orifice 110 concealed from view by a seal 806. The seal 806 provides protection of the backside of the components exposed within the load sensor orifice 110 from the braking environment. The load sensor 802 depicted in FIG. 8 includes a mating connector 804 to enable subsequent alignment with adjacent components during brake caliper assembly (see e.g. FIG. 2) To illustrate, the cross-sectional view of FIG. 9 illustrates a partial assembly operation where the transmission shaft 208 is disposed within the annular orifice, with the top portion of the load sensor 802 (identified by reference character 204 in FIG. 9) oriented on the opposite side of the transmission shaft 208 from the mating connector 804.

FIG. 9 is a cross-sectional view of a portion of an electromechanical braking system, illustrating the substantially perpendicular orientation of the EMB connector 100 with respect to the internal load sensor 204.

FIG. 9 illustrates a cross-sectional view of both the load sensor 802 and the EMB connector 100 depicted in the perspective view of FIG. 8 with respect to other selected braking components after partial assembly. In FIG. 9, a cross-section of the top portion of the load sensor 802 of FIG. 8 is identified by reference character 204 (as in FIG. 2). Assembly may include alignment of load sensor connectors/pins oriented along the load sensor axis 116 with the load sensor mating orifice 110 of the EMB connector 100. FIG. 9 illustrates that insertion of connectors/pins of the load sensor 204 into the load sensor mating orifice 110 results in the substantially perpendicular orientation of the body axis 108 of the EMB connector 100 with respect to the load sensor axis 116. FIG. 9 illustrates that the seal 806 depicted in FIG. 8 ensures that the pins/connectors of the load sensor 204 as well as the internal components within the load sensor orifice 110 of the EMB connector 100 are not exposed to the interior of the brake caliper assembly after the alignment/insertion operation.

The cross-sectional view of FIG. 9 further illustrates that at least a portion of the transmission shaft 208 (see FIG. 2) may be disposed within the annular orifice of the load sensor 802 depicted in the perspective view of FIG. 8. The mating connector 804 is disposed on the opposite side of the transmission shaft 208 and may be inserted into a mating orifice that may be machined into the brake caliper 220 (on an opposite side of the transmission shaft 208 from the EMB connector 100), as shown in FIG. 2 after full assembly.

Other selected components of the electromechanical braking system include a brake caliper pad insertion area 810 (with an associated brake caliper pad omitted in the cross-sectional view of FIG. 9), a screw 812, and a piston 820. In a "brake-by-wire" operation, the transmission shaft 208 may be mated to the screw 812, and the screw 812 may move the piston 820 to increase/decrease an amount of stopping force to be applied by a brake caliper pad mounted to the brake caliper 220 within the brake caliper pad insertion area 810. The amount of stopping force applied during a braking operation may be useful as feedback to an ECU (not shown) in conjunction with other variables (e.g., speed, stopping distance, etc.) to iteratively adjust the "brake-by-wire" parameters for an effective braking operation. As such, the load sensor 204 may be configured to measure force applied to the brake pad and communicate the force measurements (also referred to herein as "load sensor data") as feedback to the ECU. The EMB connector 100 of the present disclosure facilitates reliable communication of such load sensor data from the load sensor 204 on the interior of the brake caliper assembly to the exterior of the brake caliper assembly. As previously described herein, individual connectors/pins of the load sensor 204 are aligned with the compressible components 302-306 within the load sensor mating orifice 110. Each of the individual compressible components 302-306 is coupled to a conductive component (see e.g., the conductive component 118 depicted in the cut-away view of FIG. 6 for the second compressible component 304) that traverses the body 102 of the EMB connector from the distal end 104 to the proximal end 106, terminating in the corresponding individual pins 502-506. The individual pins 502-506 are exposed on the exterior of the brake caliper assembly within the mating harness orifice 112 for subsequent mating with connectors of a wire harness (not shown). One end of the wire harness may include connectors suitable for mating with the individual pins 502-506, and the other end of the wire harness may be electrically coupled to the ECU, thereby providing individual conductive pathways for separate load sensor signals from the interior of the brake caliper assembly to the ECU in order to provide feedback to the ECU during brake-by-wire operations.

It will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may be dependent from any or all claims in a multiple dependent manner even though such has not been originally claimed.

What is claimed is:

1. An electromechanical braking (EMB) connector for electrical communication between an interior of a brake caliper assembly and an exterior of the brake caliper assembly, the EMB connector comprising:
   a body having a distal end for insertion into the interior of the brake caliper assembly and a proximal end for exposure on the exterior of the brake caliper assembly, the distal end and the proximal end defining a body axis;
   a load sensor connector for coupling with a load sensor disposed on the interior of the brake caliper assembly, wherein the load sensor connector is compressible along a load sensor axis that is substantially perpendicular to the body axis; and
   a conductive component coupled to the load sensor connector, the conductive component enabling electrical connection of the load sensor to the exterior of the brake caliper assembly.

2. The EMB connector of claim 1, wherein the load sensor connector includes a plurality of compressible components, the plurality of compressible components including at least a first compressible component and a second compressible component.

3. The EMB connector of claim 2, wherein the conductive component includes a plurality of pins, and wherein individual compressible components of the plurality of compressible components are coupled to individual pins of the plurality of pins.

4. The EMB connector of claim 3, wherein:
   the first compressible component is coupled to a first pin of the plurality of pins, the first pin enabling communication of a first electrical signal from the load sensor to the exterior of the brake caliper assembly; and
   the second compressible component is coupled to a second pin of the plurality of pins, the second pin enabling communication of a second electrical signal from the load sensor to the exterior of the brake caliper assembly.

5. The EMB connector of claim 4, wherein the plurality of compressible components further comprises a third compressible component, and wherein the third compressible component is coupled to a third pin of the plurality of pins, the third pin enabling communication of a third electrical signal from the load sensor to the exterior of the brake caliper assembly.

6. The EMB connector of claim 1, wherein the distal end of the body includes a load sensor mating orifice, and wherein the load sensor connector is disposed within the load sensor mating orifice.

7. The EMB connector of claim 6, wherein the proximal end of the body includes a wire harness mating orifice, and wherein the conductive component includes a distal portion that is exposed within the load sensor mating orifice and a proximal portion that is exposed within the wire harness mating orifice.

8. A brake caliper assembly comprising:
   a brake caliper having an orifice extending through the brake caliper from an exterior of the brake caliper assembly to an interior of the brake caliper assembly;
   a load sensor disposed within the interior of the brake caliper assembly; and
   an electromechanical braking (EMB) connector enabling electrical connection of the load sensor to the exterior of the brake caliper assembly, the EMB connector including:
      a body having a distal end exposed on the interior of the brake caliper assembly and a proximal end exposed on the exterior of the brake caliper assembly, the distal end and the proximal end defining a body axis;
      a load sensor connector coupled to the load sensor, wherein the load sensor connector is compressible along a load sensor axis that is substantially perpendicular to the body axis; and
      a conductive component coupled to the load sensor connector, the conductive component enabling electrical connection of the load sensor to the exterior of the brake caliper assembly.

9. The brake caliper assembly of claim 8, wherein the distal end of the body of the EMB connector includes a load sensor mating orifice, and wherein the load sensor connector includes a plurality of compressible components disposed within the load sensor mating orifice.

10. The brake caliper assembly of claim 9, wherein the proximal end of the body of the EMB connector includes a wire harness mating orifice, and wherein the conductive component includes a distal portion that is exposed within the load sensor mating orifice and a proximal portion that is exposed within the wire harness mating orifice.

11. The brake caliper assembly of claim 10, wherein the conductive component includes a plurality of pins within the wire harness mating orifice, and wherein individual compressible components of the plurality of compressible components are coupled to individual pins of the plurality of pins.

12. The brake caliper assembly of claim 11, further comprising a wire harness having mating components to receive the plurality of pins.

13. The brake caliper assembly of claim 12, wherein the individual pins of the plurality of pins enable communication of individual electrical signals from the load sensor to an electronic control unit (ECU) via the wire harness.

14. The brake caliper assembly of claim 13, wherein:
   the plurality of compressible components includes a first compressible component and a second compressible component;
   the first compressible component is coupled to a first pin of the plurality of pins, the first pin enabling communication of a first electrical signal from the load sensor to the ECU via the wire harness; and the second compressible component is coupled to a second pin of the plurality of pins, the second pin enabling communication of a second electrical signal from the load sensor to the ECU via the wire harness.

15. The brake caliper assembly of claim 14, wherein the plurality of compressible components further includes a third compressible component, and wherein the third compressible component is coupled to a third pin of the plurality of pins, the third pin enabling communication of a third electrical signal from the load sensor to the ECU via the wire harness.

16. An electromechanical braking (EMB) system comprising:
  a brake caliper assembly comprising a brake caliper having an orifice extending through the brake caliper from an exterior of the brake caliper assembly to an interior of the brake caliper assembly;
  a load sensor disposed within the interior of the brake caliper assembly; and
  an EMB connector enabling electrical connection of the load sensor to an electronic control unit (ECU) on the exterior of the brake caliper assembly, the EMB connector including:
    a body having a distal end exposed on the interior of the brake caliper assembly and a proximal end exposed on the exterior of the brake caliper assembly, the distal end and the proximal end defining a body axis;
    a load sensor connector coupled to the load sensor, wherein the load sensor connector is compressible along a load sensor axis that is substantially perpendicular to the body axis; and
    a conductive component coupled to the load sensor connector, the conductive component enabling electrical connection of the load sensor to the exterior of the brake caliper assembly.

17. The EMB system of claim 16, wherein:
  the proximal end of the body of the EMB connector includes a wire harness mating orifice;
  the conductive component includes a distal portion that is exposed within the load sensor mating orifice and a proximal portion that is exposed within the wire harness mating orifice, the conductive component including a plurality of pins exposed within the wire harness mating orifice; and
  individual compressible components of the plurality of compressible components are coupled to individual pins of the plurality of pins.

18. The EMB system of claim 17, further comprising a wire harness having mating components to receive the plurality of pins.

19. The EMB system of claim 18, wherein individual pins of the plurality of pins enable communication of individual electrical signals from the load sensor to the ECU via the wire harness.

20. The EMB system of claim 19, wherein:
  a first compressible component of the plurality of compressible components is coupled to a first pin of the plurality of pins, the first pin enabling communication of a first electrical signal from the load sensor to the ECU via the wire harness;
  a second compressible component of the plurality of compressible components is coupled to a second pin of the plurality of pins, the second pin enabling communication of a second electrical signal from the load sensor to the ECU via the wire harness; and
  a third compressible component of the plurality of compressible components is coupled to a third pin of the plurality of pins, the third pin enabling communication of a third electrical signal from the load sensor to the ECU via the wire harness.

* * * * *